United States Patent
Connors et al.

(10) Patent No.: US 8,705,493 B2
(45) Date of Patent: Apr. 22, 2014

(54) METHOD AND APPARATUS FOR SERVICE IDENTIFICATION IN A WIRELESS COMMUNICATION SYSTEM

(75) Inventors: Dennis P. Connors, San Diego, CA (US); Gene Marsh, San Diego, CA (US)

(73) Assignee: WI-LAN, Inc., Ottawa (CA)

( * ) Notice: Subject to any disclaimer, the term of this patent is extended or adjusted under 35 U.S.C. 154(b) by 1582 days.

(21) Appl. No.: 11/963,504

(22) Filed: Dec. 21, 2007

(65) Prior Publication Data

US 2008/0259879 A1  Oct. 23, 2008

Related U.S. Application Data

(60) Provisional application No. 60/912,661, filed on Apr. 18, 2007, provisional application No. 60/913,172, filed on Apr. 20, 2007, provisional application No. 60/953,452, filed on Aug. 1, 2007, provisional application No. 60/971,837, filed on Sep. 12, 2007.

(51) Int. Cl.

| | |
|---|---|
| *H04J 3/00* | (2006.01) |
| *H04W 4/00* | (2009.01) |
| *H04J 1/00* | (2006.01) |
| *H04J 3/16* | (2006.01) |
| *H04B 17/00* | (2006.01) |

(52) U.S. Cl.
USPC ........... 370/336; 370/328; 370/331; 370/343; 370/465; 455/67.11

(58) Field of Classification Search
USPC ........ 370/336, 328, 331, 465, 343; 455/67.11
See application file for complete search history.

(56) References Cited

U.S. PATENT DOCUMENTS

| | | | |
|---|---|---|---|
| 5,452,288 | A | 9/1995 | Rahuel et al. |
| 5,544,198 | A | 8/1996 | Saalfrank et al. |
| 5,659,685 | A | 8/1997 | Williams et al. |
| 5,740,534 | A | 4/1998 | Ayerst et al. |

(Continued)

FOREIGN PATENT DOCUMENTS

| | | |
|---|---|---|
| EP | 1 237 371 | 9/2002 |
| EP | 1237371 | 9/2002 |

(Continued)

OTHER PUBLICATIONS

Wang et al., "System Architecture and Cross-Layer Optimization of Video Broadcast over WiMAX", IEEE Journal on Selected Areas in Communications, vol. 25, No. 4, May 2007, pp. 712-721.

(Continued)

*Primary Examiner* — Ian N Moore
*Assistant Examiner* — Kiet Tang
(74) *Attorney, Agent, or Firm* — Volpe and Koenig, P.C.

(57) ABSTRACT

Methods, apparatuses, and systems for announcing services available in a macro-diversity region of a data frame broadcast by a plurality of base stations in a single frequency network to a plurality of subscriber stations, includes a data frame with at least a data region and a macro-diversity region. A media access control (MAC) management message is generated which identifies content and characteristics of the content in the macro-diversity region. Then the MAC management message is transmitted in the data region of the data frame, wherein the MAC management message is decoded by a client station to determine if there is content of interest to the client station in the macro-diversity region of the data frame.

22 Claims, 7 Drawing Sheets

(56) References Cited

U.S. PATENT DOCUMENTS

| | | | |
|---|---|---|---|
| 5,828,659 A | 10/1998 | Teder et al. | |
| 5,867,791 A | 2/1999 | Chambert | |
| 5,892,910 A | 4/1999 | Safadi | |
| 6,009,325 A | 12/1999 | Retzer et al. | |
| 6,112,100 A | 8/2000 | Ossoinig et al. | |
| 6,172,988 B1 | 1/2001 | Tiernan et al. | |
| 6,192,038 B1 | 2/2001 | Wallerius et al. | |
| 6,212,190 B1 | 4/2001 | Mulligan et al. | |
| 6,502,131 B1 | 12/2002 | Vaid et al. | |
| 6,504,830 B1 | 1/2003 | Ostberg et al. | |
| 6,628,638 B1 | 9/2003 | Sato et al. | |
| 6,721,797 B1 | 4/2004 | Kim | |
| 6,847,826 B1 | 1/2005 | Wesby et al. | |
| 6,898,640 B1 | 5/2005 | Kurita et al. | |
| 7,035,215 B1 | 4/2006 | Engdahl | |
| 7,058,407 B2 | 6/2006 | Chi et al. | |
| 7,099,348 B1 | 8/2006 | Warwick et al. | |
| 7,107,061 B1 | 9/2006 | Tontiruttananon et al. | |
| 7,242,960 B2 | 7/2007 | Van Rooyen | |
| 7,283,817 B2 | 10/2007 | Salo et al. | |
| 7,301,905 B1 | 11/2007 | Tontiruttananon et al. | |
| 7,324,832 B2 | 1/2008 | Van Rooyen | |
| 7,333,829 B2 | 2/2008 | Malone et al. | |
| 7,362,735 B2 | 4/2008 | Mantha | |
| 7,421,244 B2 | 9/2008 | Van Rooyen | |
| 7,450,899 B2 | 11/2008 | Roberts et al. | |
| 7,469,413 B1 | 12/2008 | Mizutome et al. | |
| 7,522,536 B2 | 4/2009 | Roberts et al. | |
| 7,593,738 B2 | 9/2009 | Anderson | |
| 7,599,327 B2 | 10/2009 | Zhuang | |
| 7,613,104 B2 | 11/2009 | Bhatt et al. | |
| 7,768,966 B2 | 8/2010 | Yoon et al. | |
| 2001/0030956 A1 | 10/2001 | Chillariga et al. | |
| 2001/0046240 A1 | 11/2001 | Longoni et al. | |
| 2002/0061012 A1 | 5/2002 | Thi et al. | |
| 2002/0086691 A1 | 7/2002 | Kostic et al. | |
| 2002/0138560 A1 | 9/2002 | Aaltonen et al. | |
| 2002/0160784 A1 | 10/2002 | Kuwahara | |
| 2002/0167962 A1 | 11/2002 | Kowalski | |
| 2003/0002474 A1 | 1/2003 | Alexander et al. | |
| 2003/0072255 A1 | 4/2003 | Ma et al. | |
| 2003/0095513 A1 | 5/2003 | Woodmansee et al. | |
| 2004/0017777 A1 | 1/2004 | Chaudhuri et al. | |
| 2004/0141502 A1 | 7/2004 | Corson et al. | |
| 2004/0153767 A1 | 8/2004 | Dolgonos | |
| 2004/0223449 A1 | 11/2004 | Tsuie et al. | |
| 2004/0229624 A1 | 11/2004 | Cai et al. | |
| 2005/0090235 A1 | 4/2005 | Vermola et al. | |
| 2005/0117070 A1 | 6/2005 | Wu et al. | |
| 2005/0118946 A1 | 6/2005 | Colban et al. | |
| 2005/0130661 A1 | 6/2005 | Aerrabotu et al. | |
| 2005/0153650 A1 | 7/2005 | Hikomoto | |
| 2005/0157735 A1 | 7/2005 | Kan et al. | |
| 2005/0286408 A1 | 12/2005 | Jin et al. | |
| 2006/0025079 A1* | 2/2006 | Sutskover et al. | 455/67.11 |
| 2006/0034250 A1 | 2/2006 | Kim et al. | |
| 2006/0039285 A1 | 2/2006 | Chapman et al. | |
| 2006/0079224 A1 | 4/2006 | Welnick et al. | |
| 2006/0088023 A1 | 4/2006 | Muller | |
| 2006/0098676 A1 | 5/2006 | Cai et al. | |
| 2006/0128426 A1 | 6/2006 | Rooyen | |
| 2006/0153132 A1 | 7/2006 | Saito | |
| 2006/0153147 A1 | 7/2006 | Chillariga et al. | |
| 2006/0153227 A1* | 7/2006 | Hwang et al. | 370/465 |
| 2006/0153232 A1 | 7/2006 | Shvodian | |
| 2006/0193286 A1* | 8/2006 | Naghian et al. | 370/328 |
| 2006/0205406 A1 | 9/2006 | Pekonen et al. | |
| 2006/0227718 A1 | 10/2006 | Wang et al. | |
| 2006/0233359 A1 | 10/2006 | Jung et al. | |
| 2006/0239264 A1 | 10/2006 | Kang et al. | |
| 2006/0244865 A1 | 11/2006 | Simon | |
| 2006/0246890 A1 | 11/2006 | Yasuda et al. | |
| 2006/0262744 A1 | 11/2006 | Xu et al. | |
| 2006/0262751 A1 | 11/2006 | Vermola et al. | |
| 2006/0262793 A1 | 11/2006 | Vare et al. | |
| 2006/0268673 A1 | 11/2006 | Roh et al. | |
| 2006/0285508 A1 | 12/2006 | Vermola et al. | |
| 2007/0026866 A1 | 2/2007 | Krishnamurthi et al. | |
| 2007/0070180 A1 | 3/2007 | Rooven | |
| 2007/0091857 A1 | 4/2007 | Elstermann | |
| 2007/0165104 A1 | 7/2007 | Khan et al. | |
| 2007/0165575 A1 | 7/2007 | Niwano | |
| 2007/0167159 A1 | 7/2007 | Ramesh et al. | |
| 2007/0171910 A1 | 7/2007 | Kumar | |
| 2007/0223612 A1 | 9/2007 | Simon | |
| 2007/0240188 A1 | 10/2007 | Vermola et al. | |
| 2007/0249380 A1 | 10/2007 | Stewart et al. | |
| 2007/0274253 A1* | 11/2007 | Zhang et al. | 370/328 |
| 2008/0008176 A1 | 1/2008 | Lim et al. | |
| 2008/0037460 A1* | 2/2008 | Venkatachalam | 370/328 |
| 2008/0137652 A1 | 6/2008 | Herrmann et al. | |
| 2008/0152018 A1 | 6/2008 | Ma et al. | |
| 2008/0170529 A1 | 7/2008 | Connors et al. | |
| 2008/0170530 A1 | 7/2008 | Connors et al. | |
| 2008/0198785 A1 | 8/2008 | Huang | |
| 2008/0205322 A1 | 8/2008 | Cai et al. | |
| 2008/0259813 A1 | 10/2008 | Matta et al. | |
| 2008/0316943 A1 | 12/2008 | Mosker et al. | |
| 2009/0028276 A1 | 1/2009 | Van Rooyen | |
| 2009/0129334 A1* | 5/2009 | Ma et al. | 370/331 |
| 2009/0219909 A1* | 9/2009 | Ko et al. | 370/343 |
| 2009/0252070 A1 | 10/2009 | Connors et al. | |
| 2010/0020686 A1 | 1/2010 | Lee et al. | |
| 2010/0077173 A1 | 3/2010 | Rao et al. | |
| 2010/0177643 A1 | 7/2010 | Matta et al. | |
| 2010/0241613 A1 | 9/2010 | Rao | |
| 2013/0064253 A1 | 3/2013 | Helms et al. | |

FOREIGN PATENT DOCUMENTS

| | | |
|---|---|---|
| EP | 1 594 330 | 11/2005 |
| EP | 1594330 A | 11/2005 |
| JP | 2003-018108 | 1/2003 |
| JP | 2005-323112 | 11/2005 |
| JP | 2006-074500 | 3/2006 |
| JP | 2006-081171 | 3/2006 |
| JP | 2006081171 A | 3/2006 |
| KR | 10-2004-0000953 | 1/2004 |
| KR | 2004-0000953 | 1/2004 |
| KR | 2005-0017046 | 2/2005 |
| KR | 20050017046 A | 2/2005 |
| WO | 01/50782 | 7/2001 |
| WO | 0150782 | 7/2001 |
| WO | 03-030451 | 4/2003 |
| WO | 03/030451 | 4/2003 |
| WO | 03/081938 | 10/2003 |
| WO | 03/081938 A | 10/2003 |
| WO | 2006/047941 | 5/2006 |
| WO | 2006047941 | 5/2006 |
| WO | 2006/099322 | 9/2006 |
| WO | 2006/105010 | 10/2006 |
| WO | 2006/138556 | 12/2006 |
| WO | 2007/010444 | 1/2007 |

OTHER PUBLICATIONS

Faria et al., "DVB-H: Digital Broadcast Services to Handheld Devices", Proceedings of the IEEE, vol. 94, No. 1, Jan. 2006, pp. 194-209.

"Mobile WiMAX—Part 1: A Technical Overview and Performance Evaluation", WiMAX Forum, Aug. 2006, pp. 1-53.

"Mobile WiMAX—Part II: A Comparative Analysis", WiMAX Forum, May 2006, pp. 1-47.

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands. and Corrigendum 1, IEEE Computer Society and the IEEE Microwave Theory and Techniques Society, IEEE Std 802.16e—2005 and IEEE Std 802.16—2004/Cor1-2005, Feb. 28, 2006.

IEEE Standard for Local and metropolitan area networks, Part 16: Interface for Fixed Broadband Wireless Access Systems, IEEE Com-

(56) References Cited

OTHER PUBLICATIONS puter Society and the IEEE Microwave Theory and Techniques Society, IEEE Std 802.16, Oct. 1, 2004.

QUALCOMM Incorporation, "MediaFlo Technology Overview", 2007, www.qualcomm.com/mediaflo.

Digital Video Broadcasting (DVB); Transmission System for Handheld Terminals (DVB-H), ETSI EN 302 304 V1.1.1 (Nov. 2004) European Standard (Telecommunications series).

QUALCOMM Incorporation, "Flo Technology Brief", 2005, www.qualcomm.com/mediaflo.

Qualcomm Incorporation, "MediaFlo System", 2005, www.qualcomm.com/mediaflo.

Faria et al., "DVB-H: Digital Broadcast Services to Handheld Devices," Proceedings of the IEEE, vol. 94, No.1, pp. 194-209 (Jan. 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 2004).

Wang et al., "System Architecture and Cross-Layer Optimization of Video Broadcast over WiMAX," IEEE Journal on Selected Areas in Communciation, vol. 25, No. 4, pp. 712-721 (May 2007).

International Search Report/Written Opinion issued in PCT/US08/50719 on Jun. 24, 2008.

Partial International Search Report issued in PCT/US08/50369 on Jun. 26, 2008.

International Search Report/Written Opinion issued in PCT/US08/50302 on Jul. 9, 2008.

Digital Video Broadcasting (DVB); Transmission System for Handheld Terminals (DVB-H), ETSI EN 302 304 V1.1.1 (Nov. 2004), Wang et al., "System Architecture and Cross-Layer Optimization of Video Broadcast over WiMAX," IEEE Journal on Selected Areas in Communication, vol. 25, No. 4, pp. 712-721 (May 2007).

Digital Video Broadcasting (DVB); Transmission System for Handheld Terminals (DVB-H), ETSI EN 302 304 V1.1.1 (Nov. 2004).

"Mobile WiMAX—Part 1: A Technical Overview and Performance Evaluation," WiMAX Forum, pp. 1-53 (Aug. 2006).

"Mobile WiMAX—Part II: A Comparitive Analysis," WiMAX Forum, pp. 1-47 (May 2006).

Faria et al., "DVB-H: Digital Broadcast Services to Handheld Devices," Proceedings of the IEEE, vol. 94, No. 1, pp. 194-209 (Jan. 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e—2005 and IEEE Std. 802.16—2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).

International Search Report and Written Opinion for PCT/US2008/050365 mailed Sep. 4, 2008.

International Search Report and Written Opinion for PCT/US2008/057875 mailed Aug. 20, 2008.

International Search Report and Written Opinion for PCT/US2008/060518 issued Sep. 4, 2008.

International Search Report and Written Opinion for PCT/US2008/060517 mailed Aug. 27, 2008.

International Search Report/Written Opinion issued in PCT/US08/50500 on May 26, 2008.

International Search Report/Written Opinion issued in PCT/US08/50743 on May 13, 2008.

International Search Report/Written Opinion issued in PCT/US2008/057883 on Jul. 29, 2008.

International Search Report/Written Opinion issued in PCT/US2008/050719 on Jun. 24, 2008.

International Search Report/Written Opinion issued in PCT/US2008/050302 on Jul. 9, 2008.

Partial International Search Report issued in PCT/US2008/050369 on Jun. 26, 2008.

Qualcomm Corporation, "Flo Technology Brief," www.qualcomm.com/mediaflo (2005).

Qualcomm Corporation, "MediaFlo System," www.qualcomm.com/mediaflo (2005).

Qualcomm Corporation, "MediaFlo Technology Overview," www.qualcomm.com/mediaflo (2007).

Wang et al., "System Architecture and Cross-Layer Optimization of Video Broadcast over WiMAX," IEEE Journal on Selected Areas in Communication, vol. 25, No. 4, pp. 712-722 (May 2007).

* cited by examiner

METHOD AND APPARATUS FOR SERVICE IDENTIFICATION IN A WIRELESS COMMUNICATION SYSTEM

RELATED APPLICATIONS

This application claims the benefit of U.S. Provisional Patent Application Ser. No. 60/912,661, filed Apr. 18, 2007, entitled "Base Station Synchronization For a Single Frequency Network", Ser. No. 60/913,172, filed Apr. 20, 2007, entitled "Wireless Communications System With Broadcasting", Ser. No. 60/953,452, filed Aug. 1, 2007, entitled "Base Stations Synchronization For a Single Frequency Network", and Ser. No. 60/971,837 filed Sep. 12, 2007, entitled "Base Station Synchronization For a single Frequency Network" which are hereby incorporated by reference in their entirety.

BACKGROUND

1. Field

The present disclosure relates generally to a wireless communication system, and in particular to a wireless broadcast communication system.

2. Background

Wireless communication networks typically have a plurality of servicing base stations which receive and transmit signals to users' devices within the service area of the respective base stations. Communication between a user and their respective base station is maintained as a user moves about the network service area by handing off the user from one base station to another.

Many new services are being offered to customers of wireless communication carriers. One such service is providing customers with multimedia content via the wireless communication network. For example, it is desired to provide audio/video content to customers as they move about the network.

Providing multimedia content via wireless communication networks presents several challenges. For example, multimedia content is typically broadcast to users that want the content. A user that desires to receive the broadcast content, decodes the broadcasted content and examines the content available to determine if there is content that is of interest to the user.

In order to determine if the broadcasted content includes content of interest to the user, the user in current systems needs to decode the broadcast content and examine it to determine if it contains the content of interest to the user. Decoding the broadcast content consumes resources of the user's device. These resources may not be efficiently used if it turns out that there is not any content of interest in the broadcasted content.

Therefore, there is a need for improved systems, apparatus, and techniques for receiving broadcasting content, such as multimedia content, by users in a wireless communication network.

SUMMARY

The present disclosure includes methods, apparatuses, and systems as described in the written description and claims. In one embodiment, a method of broadcasting content data to a plurality of client stations includes receiving information regarding a macro-diversity region in which at least one packet comprising content data is allocated. Generating a management message identifying the content data allocated to the macro-diversity region. Transmitting a data frame comprising the macro-diversity region and a data region, wherein the management message is included in the data region of the data frame.

The management message can include a broadcast channel identifier (CID) that identifies a broadcast service to which the content data belongs. The management message can include a broadcast service field. Generating a management message can also include generating a management message in which information regarding an encoding used in encoding the content data is included in the broadcast service field. At least one packet comprising content data for each of a plurality of different content channels can be allocated to the macro-diversity region, and wherein generating a management message further comprises generating a management message in which information for identifying each of the different content channels can be included in the broadcast service field. The data frame can be an orthogonal frequency division multiple access (OFDMA) frame.

In one embodiment, the data region and the macro-diversity region of the data frame can be transmitted using different modulation and coding schemes. A map message can be generated for transmission in the macro-diversity region of the data frame wherein the map message comprises the broadcast channel identifier identifying the content data. In another embodiment, the plurality of client stations can be included in a single frequency network, and wherein transmitting the management message in a data region of the data frame includes transmitting, by a base station in the single frequency network, a data frame comprising the macro-diversity region and the data region including the management message, wherein the transmission of the macro-diversity region by the base station is synchronized with a transmission of a macro-diversity region by at least one other base station in the single frequency network.

In one embodiment, a method for identifying content data in a macro-diversity region of a data frame, the data frame comprising at least a data region and a macro-diversity region, includes receiving the data frame. Decoding a management message in the data region, wherein the management message includes information identifying content data available in the macro-diversity region of the data frame. Determining whether to decode at least a portion of the macro-diversity region of the data frame based on the information identifying the content data in the management message Decoding at least a portion of the macro-diversity region to obtain content data if it is determined to decode the at least a portion of the macro-diversity region. Providing the decoded content data for presentation to a user.

The formation identifying the content data in the management message can include a broadcast channel identifier (CID) that identifies a broadcast service to which the content data belongs. The management message can include a broadcast service field. Also, information identifying the content data in the management message can include information regarding an encoding used in encoding the content data stored in the broadcast service field. The content data in the macro-diversity region can include content data for each of a plurality of different content channels, wherein the information identifying the content data in the management message comprises information stored in the broadcast service field for identifying each of the different content channels. Receiving the data frame can include receiving an orthogonal frequency division multiple access (OFDMA) frame. The data region and the macro-diversity region of the received data frame can be encoded using different modulation and coding schemes. The macro-diversity region of the received data frame can include a map that includes a field storing a broadcast channel identifier identifying the content data.

In one embodiment of a broadcast system for use in broadcasting content data to a plurality of client stations using a data frame, the data frame comprising at least a data region and a macro-diversity region, the system includes a first interface configured to receive information regarding a macro-diversity region comprising at least one packet comprising content data. There is also controller configured to generate a management message that includes information identifying the content data allocated to the macro-diversity region, wherein the management message is for transmission in the data region of the data frame. The system also includes a transmitter configured to transmit the management message and the content data, wherein the management message is transmitted in the data region of the data frame and the content data in the macro-diversity region of the data frame.

The management message can include a broadcast channel identifier (CID) that identifies a broadcast service to which the content data belongs. The management message can also include a broadcast service field. The controller can be configured to include information regarding an encoding used in encoding the content data in the broadcast service field. The controller can also be configured to include in the broadcast service field information identifying each of a plurality of different content channels allocated to the macro-diversity region. The data frame can be an orthogonal frequency division multiple access (OFDMA) data frame. The macro-diversity region of the data frame can include a map message comprising the broadcast channel identifier identifying the content data.

In one embodiment of a client station that receives services broadcast in a data frame, the data frame comprising at least a data region and a macro-diversity region, the client station includes a receiver configured to receive the data frame. The client station also includes a decoder configured to decode a management message in the data region of the data frame, wherein the management message identifies content data included in the macro-diversity region of the data frame. A processor is included that is configured to determine whether to decode at least a portion of the macro-diversity region based on the information identifying the content data and to provide an instruction to the decoder regarding whether to decode the macro-diversity region based on the determination, wherein the decoder is further configured to decode the at least a portion of the macro-diversity region based on receipt of the instruction from the processor.

The management message can include a broadcast channel identifier (CID) that identifies a broadcast service to which the content data belongs. The management message can also include a broadcast service field. The decoder can be configured to obtain, from the broadcast service field, information regarding an encoding used in encoding the content data. Also, the decoder can be configured to obtain, from the broadcast service field, information identifying each of a plurality of different content channels transmitted in the macro-diversity region. The data frame can be an orthogonal frequency division multiple access (OFDMA) frame.

Other features and advantages of the present disclosure should be apparent after reviewing the following detailed description and accompanying drawings which illustrate, by way of example, aspects of the disclosure.

BRIEF DESCRIPTION OF THE DRAWINGS

These and other aspects, advantages and details of the present disclosure, both as to its structure and operation, may be gleaned in part by a study of the accompanying exemplary drawings, in which like reference numerals refer to like parts. The drawings are not necessarily to scale, emphasis instead being placed upon illustrating the principles of the disclosure.

DETAILED DESCRIPTION

Figure 1:
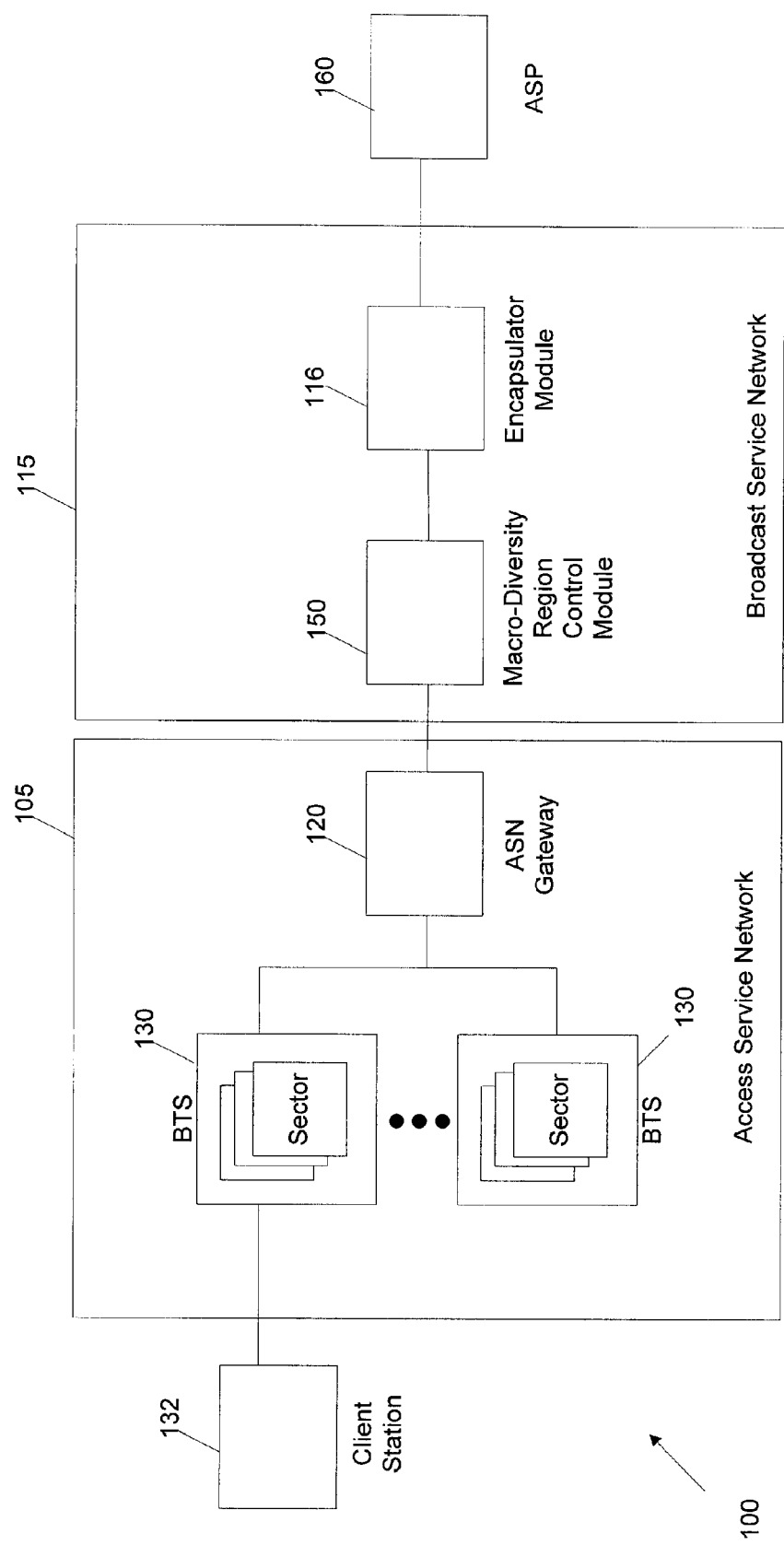
FIG. 1 is a block diagram of an example network in which a data frame comprising a macro-diversity region may be used for broadcasting data to a plurality of client stations in accordance with an embodiment.

Certain embodiments as disclosed herein provide for methods and systems for communication over a broadband wireless air interface. After reading this description it will become apparent how to implement the various alternative embodiments and alternative applications. However, although various embodiments will be described herein, it is understood that these embodiments are presented by way of example only, and not limitation. As such, this detailed description of various alternative embodiments should not be construed to limit the scope or breadth of the appended claims.

In accordance with an embodiment, a plurality of base station transceivers (BTSs) broadcast content data to a plurality of client stations in a network. This network may be, for example, a single frequency network (SFN). As used herein, a SFN refers to a network capable of simultaneously broadcasting the same signal (i.e., the same content) over the same frequency channel from multiple transmitters (e.g., BTSs). Further, as used herein the term "content data" refers to any data regarding any information that may be of interest to a user, such as, for example, audio (e.g., music, speech, etc.), visual (e.g., pictures, images, movies, television, etc.), textual (e.g., word processing documents, spreadsheets, etc.), or other types of data regarding content of possible interest to a user. Further, as used herein the term "broadcast service" refers to a collection of broadcasted content data. For example, in an embodiment, a client station may subscribe to a particular broadcast service that includes one or more channels of audio/video content data, such as, for example, a plurality of news channels (e.g., CNN, Fox News, etc.), a plurality of television channels for a particular locality (e.g., WABC, WNBC, etc.), a plurality sports channels (e.g., ESPN), etc. This collection of channels may be provided by, for example, an application service provider (ASP) or other content provider and the content data for each channel encoded using a common type of encoding (e.g., MPEG) and resolution (e.g., low resolution for cell phone displays, high resolution for high definition televisions, etc.)

In an embodiment, the BTSs are configured to broadcast content data to the client stations using a macro-diversity, or broadcast, region of a downlink frame in a communication signal transmitted by the BTSs. As used herein, the term "macro-diversity region" refers to a portion of a data frame useable for broadcasting information. Exemplary macro-diversity regions include, for example, a Multicast and Broadcast Services (MBS) region of an Orthogonal Frequency Division Multiple Access (OFDMA) data frame, such as, for example, an OFDMA data frame in accordance with the Worldwide Interoperability for Microwave Access (WiMAX) standards (i.e., the Institute for Electrical and Electronics Engineers (IEEE) 802.16 Working Group on Broadband Wireless Access Standards). A further description of an exemplary macro-diversity region of a data frame is presented below. Further, as used herein the terms macro-diversity region and broadcast region are interchangeable.

In accordance with an embodiment, each BTS broadcasting content data broadcasts a management message, such as, for example, a medium access control (MAC) message, that includes information identifying the broadcasted content data. This management message may, for example, include the broadcast channel identifier (CID) to identify that the particular BTS broadcasts the particular content data identified by the broadcast CID. For example, a BTS may broadcast a MAC management message including a broadcast CID that identifies that a particular broadcast service (i.e., the content data associated with the particular broadcast service) is included in a macro-diversity region broadcasted by the BTS. In an embodiment, this MAC management message is broadcast in a region of the data frame typically used for transmitting other types of MAC messages as opposed to the macro-diversity region of the data frame. Further, in an embodiment, this MAC message may comprise additional information, such as, for example, information identifying the type of encoding used in encoding the content data, the resolution of the content data, and identifiers for the particular channels of content data (e.g., ESPN, CNN, etc.) broadcasted in the macro-diversity region. A further description of an exemplary MAC message is provide below as well as exemplary locations in a data frame for transmitting the MAC message along with the information this exemplary message may contain. Further, in yet another embodiment, this management message identifying the broadcasted data in the data frame may be provided using other mechanisms, such as, for example, providing the manage message using a separate overhead channel using, for example, a different frequency channel than used for transmitting the data frame.

This MAC message may then be received by the client stations and examined to determine if the BTS is broadcasting content data of interest to the client station. If not, the client station can ignore the signal broadcast by the BTS. If, however, the MAC message identifies that the BTS is broadcasting content data desired by the client station, the client station may then decode the macro-diversity region of the data frame and retrieve the content data of interest.

FIG. 1 is a block diagram of an example network 100 for broadcasting data to a plurality of client stations 132 in accordance with an embodiment. For exemplary purposes, network 100 will be described with reference to a network 100 in which data is broadcasted to client stations 132 using a macro-diversity region of a data frame, such as, for example, an MBS region of a WiMAX OFDMA frame.

In the example illustrated in FIG. 1, the network 100 includes at least one client station 132, an access service network (ASN) 105, a broadcast services network 115, and an application service provider (ASP) 160. In the present example, ASP 160 provides one or more streams of IP packets comprising content data for broadcast to the client stations 132. Broadcast services network 115, as illustrated, receives the stream(s) of IP packets and processes and packages the received content data for broadcast to client stations 132. ASN 105 may provide access services between the broadcast services network 115 and client stations 132 in transmitting the content data to the client stations 132.

As noted above, ASP 160 provides one or more IP streams comprising content data for broadcast to the client stations 132. These IP streams may be provided to the broadcast services network 115 directly or, for example, via a network (not shown), such as a local area network (LAN) (e.g., an Ethernet network), a metro area network (MAN), or a wide area network (WAN)(e.g., the Internet), or a combination thereof.

As noted above, this content data may comprise, for example, audio (e.g., music, speech, etc.), visual (e.g., pictures, images, movies, television, etc.), textual (e.g., word processing documents, spreadsheets, etc.), or other types of data regarding content of interest to a user. For explanatory purposes, the provided content data will be described as being audio/visual data. Further, in an embodiment, each provided IP stream may comprise content data for a particular audio/visual channel, such as, for example, one or more IP streams may comprise content data for providing a television news program (e.g., CNN, Fox News, etc.), one or more IP streams may be provided for broadcasting movies, one or more IP streams may be provided for transmitting sports programs, etc.

In an embodiment, a broadcast service provided by a particular ASP 160 is identified by a single broadcast channel identifier (CID). As noted above, a broadcast service refers to a collection of content data that may be encoded using a common encoding scheme, such as, for example, MPEG at a particular resolution (e.g., low resolution for small screens such as mobile phones, high resolution for high definition television (HDTV), etc.). This broadcast CID may then be used by the client stations 132 to determine if the broadcasted content data comprises content data that the client station desires to receive (e.g., the broadcasted content data is for a broadcast service to which the client station subscribes). For example, in an embodiment, there may be multiple ASPs 160 each providing a different broadcast service, where a client station 132 may only be enabled to receive and provide content data belonging to a particular broadcast service (e.g., the client station may only subscribe to the broadcast service proved by one particular ASP).

As illustrated, broadcast service network 115 may include an encapsulator module 116 and a macro-diversity region control module 150. Broadcast service network 115 may be operated by a single network service provider (NSP). Further, although for simplification only a single broadcast service network is illustrated, it should be understood that in application there may be multiple broadcast service networks 115 each operated by a different NSP. These other broadcast services networks may be connected to different ASNs 105 and ASPs 160, or for example, multiple broadcast service networks may be connected to a particular ASN and/or ASP.

Encapsulator module 116 may receive the IP streams from ASP 160 and time slice the received IP packets. Encapsulator module 116 may then package the time sliced IP packets into transport packets for wireless transmission of the content data. As used herein, a transport packet refers to any type of data packet useable for transporting data, and may use any type of format or protocol in transporting the data. For example, in an embodiment in which the content data comprises audio/visual content, the encapsulator module 116 may time slice the received IP packets and package the time sliced IP packets in transport packets, such as, for example, Motion Picture Expert Group 2 (MPEG-2) transport packets. Further, in an embodiment, the encapsulator module 116 may perform time slicing operation in accordance with the European Telecommunications Standards Institute (ETSI) standard for Digital Video Broadcast-Handheld (DVB-H) along with performing multi-protocol encapsulation with forward error correction (MPE-FEC). Additionally, in an embodiment, the encapsulator module 116 may wrap the packets (e.g., transport packets) with an IP header prior to outputting the wrapped packets.

The encapsulator module 116 may then provide the transport packets to the macro-diversity region control module 150. The macro-diversity region control module 150 may then package the transport frames for broadcast to the client station 132. Additionally, in an embodiment, the macro-diversity control module 150 may further insert time stamping information in the received transport packets. The time stamping information added to the transport packets (e.g., MPEG-2 transport packets) may be used by the BTSs to enable the individual BTSs 130 to time synchronize the transmission of the content data to the client stations 132, so that each BTS 130 simultaneously transmits the content data. Further, in an embodiment, the macro-diversity region control module 150 may further combine multiple received transport packets into a larger frame (referred to herein as a "mega-frame") for transmission by the BTSs 130.

In an embodiment, the macro-diversity region control module 150 defines a macro-diversity region for inclusion in a data frame for transmitting the content data to the client stations 132. For example, the macro-diversity region defined can be a Multicast Broadcast Services (MBS) region of an OFDMA data frame, such as, for example, an OFDMA data frame in accordance with IEEE 802.16e. A further description of the macro-diversity region is provided below.

As illustrated, ASN 105 includes a plurality of BTSs 130 and an ASN Gateway 120. In one embodiment, BTSs 130 may include an antenna system that is sectorized into one or more sectors with each sector transmitting and receiving signals within a corresponding coverage area, wherein the coverage area of the sector may be the same or less than the total coverage area of the BTS. ASN Gateway 120 may provide access gateway functions between the BTSs 130 and the broadcast service network 115, and may be, for example, a commercially available ASN Gateway, such as, for example, a Cisco ASN Gateway. It should be further noted that although an ASN Gateway is used in the exemplary embodiment of FIG. 1, in other embodiments an ASN Gateway need not be used.

The defined macro-diversity region may then be communicated to the BTS's 130. The BTSs 130 may comprise hardware (e.g., a processor, memory, one or more buses, etc.) and software for building data frames including the defined macro-diversity region using the information received from the macro-diversity region control module 150. These data frames may be, for example, OFDMA data frames in accordance with IEEE 802.16e. The BTSs 130 may then broadcast the OFDMA data frames including the macro-diversity region. Further, the BTSs 130 may be synchronized so that the macro-diversity regions transmitted by the BTSs 130 are identical and synchronized. It should be noted that although in this embodiment each BTS 130 simultaneously broadcasts a common macro-diversity region, the remainder of the data frames transmitted by each BTS 130 need not include common data. A further description of an exemplary data frame comprising a macro-diversity region is presented below.

Client stations 132 may be mobile, nomadic or stationary units. The client stations 132 are often referred to as, for example, mobile stations, mobile units, subscriber stations, wireless terminals or the like. Client station 132 can be, for example, a wireless handheld device, a vehicle mounted device, a portable device, client premise equipment, fixed location device, wireless plug-in accessory or the like. In some cases, client stations 132 can take the form of a handheld computer, a notebook computer, a wireless telephone, personal digital assistant, wireless email device, personal media player or the like. Further, client stations 132 may include a receiver that receives signals broadcasted by ASN 105. Client station 132 may also include one or more displays (e.g., a liquid crystal display (LCD), etc.) and speaker(s) for use in presenting content (e.g., audio and/or visual) to a user of the client device. Optionally, the client station 132 may also include a storage device (e.g., volatile or non-volatile memory) for recording the received data.

It should be noted that although FIG. 1 illustrates exemplary modules for processing the incoming content data for transmitting the content data to the client stations 132 using a macro-diversity region, in other embodiments alternate modules may be used or, for example, the functions performed by the modules may be combined or split into different modules. For example, although FIG. 1 illustrates a macro-diversity control module 150 for time stamping the incoming data and defining a macro-diversity region, in other embodiments, these functions may be split into separate modules. For example, in an embodiment, an single frequency network (SFN) module may be used that time stamps the incoming content data and packages the transport packets into mega-frames that it then communicates to the macro-diversity control module over a network, such as an Ethernet network. The macro-diversity control module in such an example, may then define the macro-diversity region using the time stamped information received from the SFN module.

It should also be further noted that although for simplification the presently described embodiment is described with reference to a system in which the BTSs 130 broadcast content data identified by only a single broadcast CID, in other embodiments the BTSs 130 may broadcast content belonging to multiple broadcast CIDs. For example, in an embodiment, one broadcast CID may be used to identify the audio/visual content data from a particular ASP encoded using one encoding scheme (e.g., MPEG data with a low resolution for display on small screens, such as cell phones); a different broadcast CID used to identify audio visual encoded using a different encoding scheme (e.g., MPEG data with a high resolution for display on a high definition television (HDTV), yet a different broadcast CID for identifying audio-only data (e.g., radio programming), etc.

Figure 2:
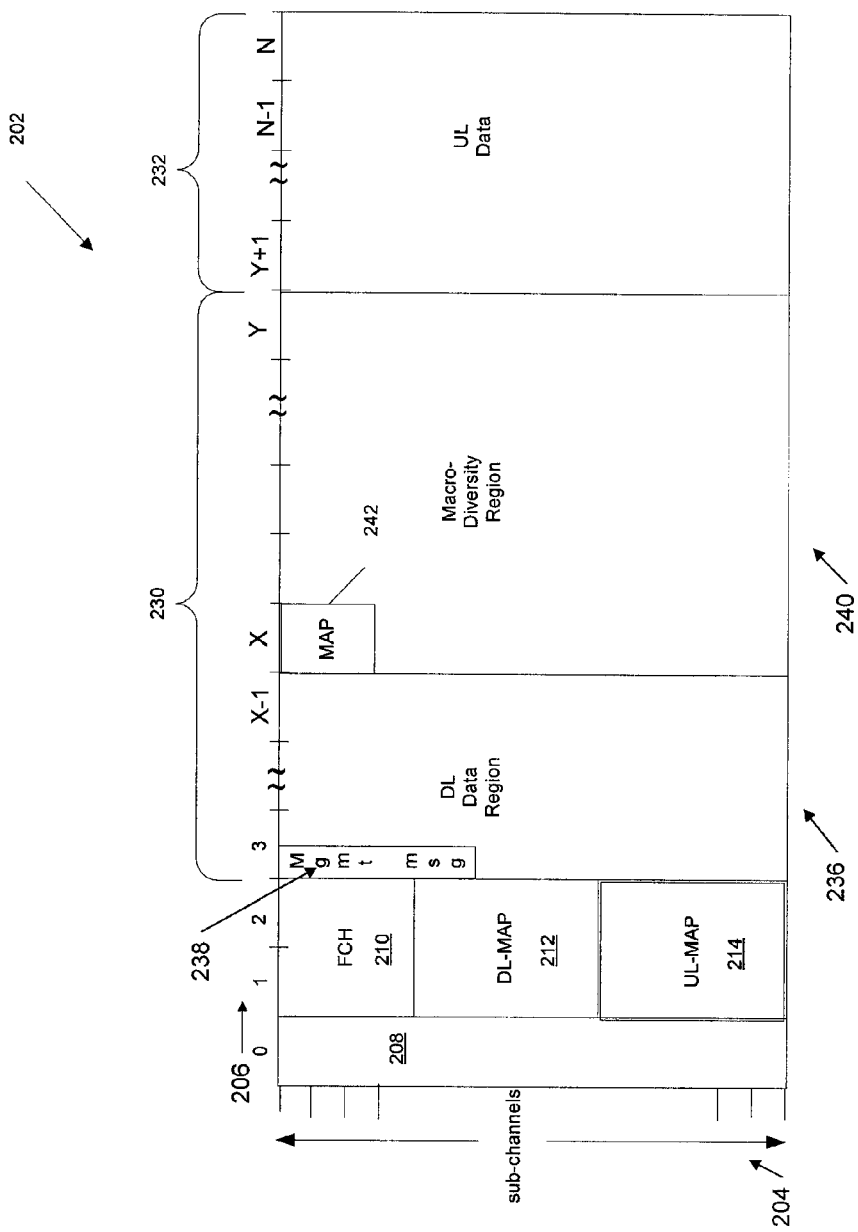
FIG. 2 is a diagram illustrating an example data frame structure that can be used to transmit data between a BTS and a client station in accordance with an embodiment.

FIG. 2 is a diagram illustrating an example data frame structure that can be used to transmit data between a BTS 130 and a client station 132. As noted above, in an embodiment, this data frame may be built by the BTSs 130. As illustrated, the data frame 202 structure can be divided into multiple sub-channels 204 (along the vertical axis in FIG. 2), with each sub-channel using a carrier frequency that is orthogonal to the carrier frequencies of other sub-channels. The frame 202 is also divided in time into symbol periods 206 (along the horizontal axis in FIG. 2). As illustrated in FIG. 2, in data frame 202, data may be carried on each of the sub-channel carrier frequencies 204 simultaneously during individual symbol periods 206. Further, a group of consecutive symbols may be treated as a symbol groups, such that the frame 202 is split into a fixed number of symbol groups each consisting of a particular number (e.g., 2, 4, etc.) of consecutive symbols.

In the example of FIG. 2, the data frame 202 includes a preamble 208 during symbol period 0. During symbol periods 1 and 2, the data frame 202 includes a frame control header (FCH) 210 and a downlink map (DL-MAP) 212 and uplink map (UL-MAP) 214. Generally, the FCH 210 may include information about the frame 202 configuration, such as coding schemes, message lengths, usable sub-channels, and the like. The FCH 210 can also carry overhead messages that include information broadcast from a BTS 130 to at least one client station 132. Alternatively, overhead messages can be included in other portions of the data frame 202.

The downlink and uplink maps 212 and 214 include information about the location of downlink and uplink content within the data frame 202. The data frame 202 includes a downlink region 230 and an uplink region 232 defined by the downlink and uplink maps. Included in the downlink region 230 is a downlink data region 236 and a macro-diversity region 240. While FIG. 2 illustrates an example of the macro-diversity region 240 being located at the end of the downlink region 230, in other embodiments the macro-diversity region 240 can be located at other positions in the downlink region 230. In addition, the macro-diversity region 240 does not need to be continuous, but can be separated into multiple regions within the downlink region 230.

The downlink region 230 may be used for transmitting information from the BTSs to the client stations, while the uplink region 232 may be used for transmitting information in the opposite direction, i.e., from the client stations to the BTSs. Further, as illustrated, management messages 238 may be transmitted from the BTSs to the client stations in the downlink data region 236 of the downlink region 240. These management messages may be, for example, MAC management messages. Further, in an embodiment, MAC management messages broadcasted to the client stations may be included in the initial (i.e., far left) portion of the downlink data region 236 with traffic bearing data (e.g., Voice over IP traffic (VOIP), World Wide Web (WWW) data, etc.) and other types of data (e.g., uni-cast MAC management messages) following the broadcasted MAC management messages in the downlink data region 336. Similarly, MAC management messages transmitted from the client stations to the BTSs may use the uplink region 232 of the data frame 202. As will be discussed in further detail below, in an embodiment, a MAC management message identifying the content data broadcasted in the macro-diversity region may be broadcast to the client stations using the downlink data region 236 and broadcasted in the same or similar manner that other MAC management messages are broadcast to the client stations.

As noted above, the macro-diversity region 240 of the downlink region 230 may be used by the BTSs for broadcasting content data to the client stations where content data belonging to a particular broadcast service is identified by a broadcast CID. For simplification, in the presently described embodiment, the broadcasted content data will all belong to a single broadcast service identified by a single broadcast CID, however, in other embodiments the macro-diversity region 240 may carry multiple broadcast services each identified by a unique broadcast CID. Further, as noted above, each particular broadcast service may comprise multiple different streams of content data, such as, for example, one or more streams for transmitting news programming (e.g., CNN, Fox News, etc.), one or more streams for transmitting sports programming (e.g., ESPN), etc.

As illustrated, the macro-diversity region 240 may include a macro-diversity region map 242 that defines the size and content of the macro-diversity region 240. In one embodiment, the macro-diversity map 242 rather than defining the macro-diversity region 240 for the data frame 202 the map 242 resides in, the macro-diversity region map 242 defines the size and content of a macro-diversity region 240 in a subsequent data frame 202. For example, the macro-diversity map 242 may define the size and content of a macro-diversity region in the next data frame in time (i.e., the frame sent immediately after the data frame in which the map 242 resides), or the second data frame 202 following the current frame, or other subsequent data frames of data. The map 242 may further include an information element (IE) including a broadcast CID that identifies the broadcast service(s) included in the macro-diversity region 240, or multiple broadcast CIDs in embodiments in which the macro-diversity region 240 includes content data belonging to different broadcast services.

In an embodiment, the BTSs 130 may transmit the different regions of frame 202 using different modulation schemes. For example, in an embodiment, the BTSs may use a simple modulation for transmitting the preamble 208 (e.g., BPSK), a different modulation scheme for transmitting the downlink data region (e.g., QPSK), yet another modulation scheme for transmitting the macro-diversity region 240 (e.g., QAM), and yet another modulation scheme for transmitting the uplink region 232 (e.g., QPSK).

Figure 3:
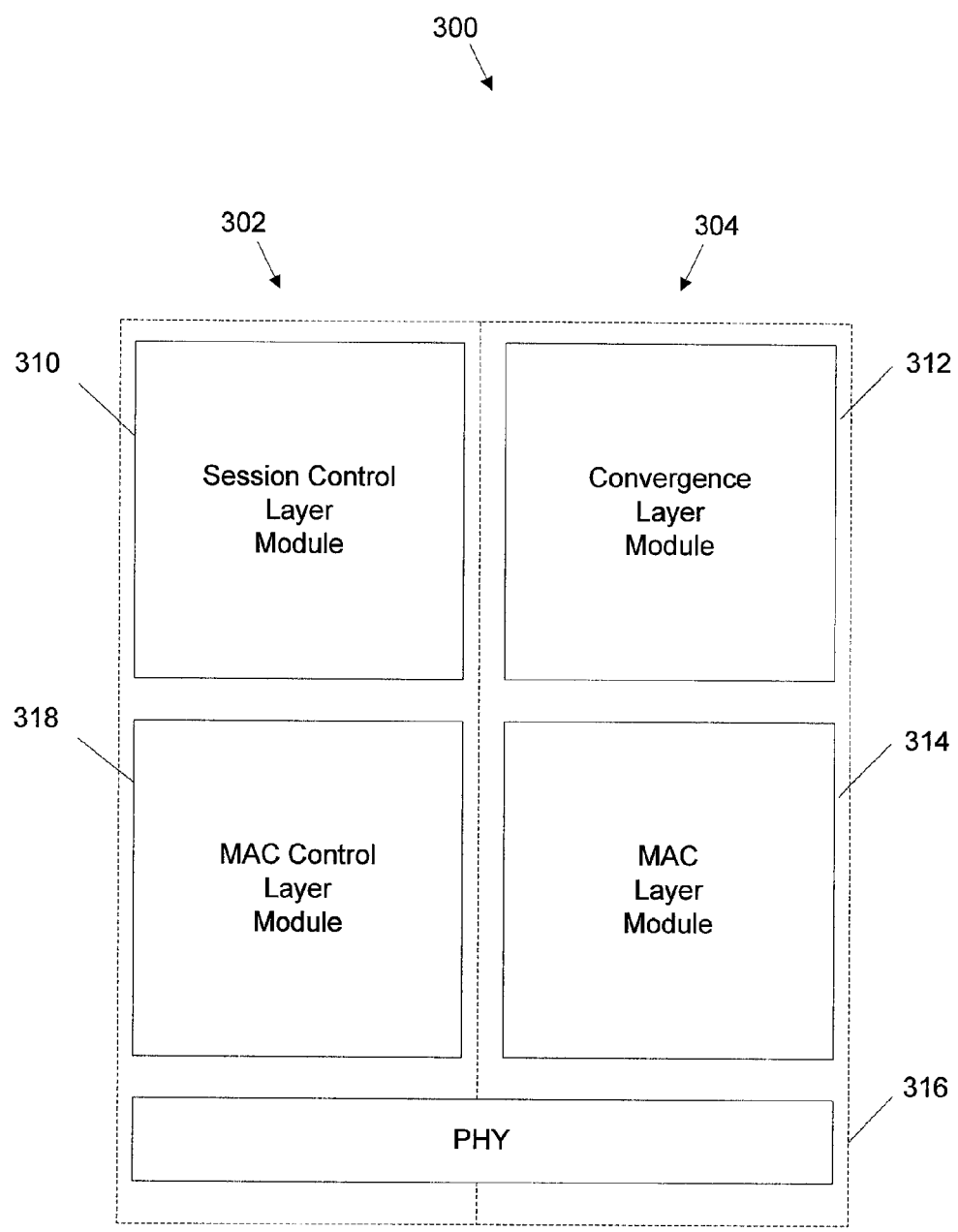
FIG. 3 is a diagram illustrating a layering model that performs processes in accordance with various protocol modules in accordance with an embodiment.

FIG. 3 provides a diagram illustrating a layering model that performs processes in accordance with various protocol modules to implement an example embodiment of the present disclosure. One or more instances of each illustrated protocol module may exist on each side, transmit and receive, of a wireless air interface link. That is, for example, this layering model may be implemented by software stored in the memory of and executed by one or more processors included in each BTS 130 and the macro-diversity region control module 150 as well as in each client station 132.

These protocol modules are grouped into two distinct types: bearer protocol modules 302, and non-bearer protocol modules 304. A bearer protocol module includes a protocol that is involved with the transmission/reception of content (payload) data across the air interface, and a non-bearer protocol module includes a protocol that is involved with the transmission/reception of control messages or overhead messages across the air interface. The layers are also referred to as bearer and non-bearer layers, depending on the types of protocol modules associated with the respective layer. Bearer and non-bearer protocol modules can be implemented on both the receive side and the transmit side, of the broadcast system.

As shown in FIG. 3, the layering model 300 may include a session control layer module 310, a convergence layer module 312, a MAC layer module 314, and a MAC control layer module 318, and a physical (phy) layer 316. In one embodiment, the session control layer module 310 provides system configuration and state maintenance. Typically the session control layer module 310 includes non-bearer protocols, and so does not carry payloads on behalf of other protocols. Although illustrated in FIG. 3, in the presently described embodiment, there may be no protocols defined for the session control layer module 310 as the presently described embodiment is described with reference to a broadcast system and as such there need not be a mutual state held at both the client stations 132 and BTSs 130.

The convergence layer module 312, in one embodiment, provides a conduit for upper layer protocols/applications to transport their data over a media access control (MAC) layer module 314 described further below. In general, the convergence layer module 312 defines protocols, interfaces, encapsulations and mappings to accommodate and interface to upper layers. In one embodiment, the convergence layer module 312 implements a Digital Video Broadcast—Handheld (DVB-H) Motion Picture Expert Group-2 (MPEG-2) Transport Stream Convergence Protocol (TSCP) to efficiently map DVB-H MPEG-2 Transport Stream packets for transport as MAC service data units (SDUs).

The MAC layer module 314 on the transmit side (e.g. in the macro-diversity region control module 150) includes a scheduler that can receive MAC service data units (SDUs) from an upper layer regarding filling physical layer (PHY) allocations with data. The MAC layer module 314 can also define burst allocations which, given the size of a macro-diversity region of a data frame, determine the size (including the OFDMA dimensions) and location of data bursts allocated within the macro-diversity region of an OFDMA frame.

The MAC layer module 312 can also include bearer protocols for processing MAC protocol data units (PDUs) for use with a physical layer 316. In one embodiment, the MAC layer module 314 includes a shared signaling MAC protocol that transmits (in a BTS) or receives (in a client station) shared signaling control PDUs. At a BTS, the shared signaling MAC protocol maps shared signaling control PDUs, such as the macro-diversity region MAP and MAC management PDUs, to the physical layer 316 channel. The MAC layer module 314 also includes a Traffic Channel MAC protocol that places and extracts MAC PDUs to and from the physical layer 316 channel. In an embodiment employing WIMAX, the MAC layer module 134 may comprise a MAC Common Part Sublayer (MCPS) in accordance with the IEEE 802.16 specification.

The layering model of FIG. 3 includes a MAC Control layer module 318. The MAC Control layer module 318 establishes an air link between a BTS and a client station. The MAC Control layer module 318 may further manages an overall state machine which determines the state of the macro-diversity region air link. The MAC Control layer module 318 also manages network initialization. Further, the MAC control layer module 318 may be responsible for building and transmitting management messages, such as, for example, a MAC management message identifying the content data included in the macro-diversity region of a data frame. A further description of exemplary management messages for identifying content data in a macro-diversity region is presented below.

In FIG. 3, the Physical layer 316 provides physical layer transport for air link messages, such as for example, forming the waveform on the transmit side for transmitting the content data or reforming PDUs from a received waveform on the receive side.

As noted above, in an embodiment, the BTSs may broadcast a MAC management message to the client stations that identifies the content data included in the macro-diversity region. In one embodiment, this MAC management message may be a Service Identity Information—Advertise (SII-ADV) MAC management message, such as described in the IEEE 802.16e. Further, in one embodiment, a Type/Length/Value element may be included within the SII-ADV message that may be used to carry broadcast connection identifier (CID) information for content data included in the macro-diversity, or broadcast, region of the data frame. In addition, the TLV can include information about the services available in the macro-diversity region, as will be discussed in further detail below. This MAC management message may be broadcast periodically without solicitation, or, for example, a client station may request that the message be transmitted.

Table 1 below shows one example of an exemplary SII-ADV message, in accordance with IEEE 802.16e, that may be used as a MAC management message for identifying content data to client stations.

TABLE 1

| Field | Length | Notes |
| --- | --- | --- |
| Management Message Type | 8 bits | Set to a value of 68 in accordance with IEEE 802.16 Standard |
| NSP List TLV | 3* bytes | If present, this lists the NSPs associated with the ASP providing the content data corresponding to a particular broadcast CID. This TLV includes a 24-bit NSP identification for each associated NSP. |
| NSP Change Count TLV | 1 byte | If present, this lists the NSP list previously announced by the NSP List TLV. For example, increment by one (modulo 256) whenever the list of the NSPs changes. |
| Broadcast Service Announcement TLV | 4* n bytes | This lists the Broadcast Services available within the macro-diversity region. This TLV may be present in every SII-ADV message by a BTS. Each broadcast service tag comprises a 16-bit broadcast CID and a 16-bit broadcast type. |

As shown in the example of Table 1, the SII-ADV message includes multiple fields. A first field, referred to as the "management message type," is used to identify what type of MAC management message the message is and in this example the value is set to 68 to identify the message as an SII-ADV message, as per IEEE 802.16e.

The second field in this exemplary SII-ADV message is referred to as the "network service provider (NSP) list TLV," and is optional in this example. If present, this field lists the NSPs associated with the ASP providing the content data. For example, as noted above, in an embodiment, a particular ASP may be connected to multiple broadcast service networks, each operated by a different NSP, for broadcasting the content data to the client stations via one or more ASNs. In this example, the NSP list TLV field includes a 24-bit NSP identification for identifying each NSP associated with the ASP. As such, the size of this field is dependent on the number of associated NSPs (i.e., the field size is three bytes in length per the number of NSPs). Further, in embodiments, in which the ASP and NSP functions are combined in a single service provider, this field may not be included.

A third field in this exemplary SII-ADV message is referred to as the "NSP change count TLV." This field is optional and in embodiments may not always be present. The field simply counts the number of changes in the NSP list TLV and is incremented by one every time the NSP list TLV changes. In one embodiment, if present, the NSP change count TLV is one byte in length and increments by one (modulo 256) whenever the list of the NSPs changes.

A fourth field in the SII-ADV message is referred to as the "broadcast service announcement TLV." This TLV, in the present example, lists the broadcast services available within the macro-diversity region of a frame. In the present example, a broadcast service announcement TLV is included in the SII-ADV message for each broadcast service available in the macro-diversity region. In the present embodiment, each broadcast service announcement TLV comprises a 2 byte long broadcast CID and a 2 byte broadcast service type identifier, for a total length of 4 bytes times the number of services available.

Figure 4:
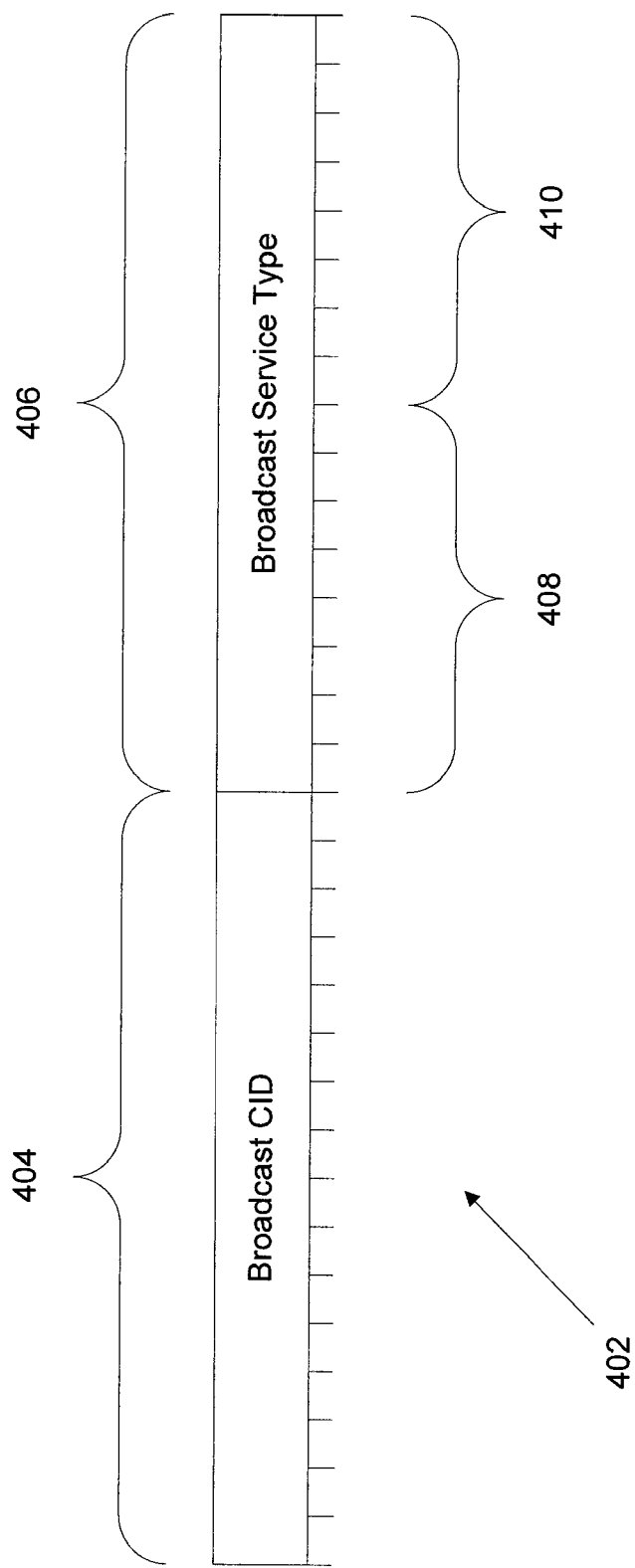
FIG. 4 is a diagram illustrating an exemplary broadcast service tag announcement in accordance with an embodiment.

FIG. 4 is a diagram illustrating an example embodiment of a broadcast service announcement TLV (also referred to herein as a broadcast service tag). As shown in FIG. 4, a broadcast service tag 402 may include, for example, two sixteen (16) bit fields 404 and 406. The first field 404 is a broadcast service CID field that includes the broadcast CID for the associated broadcast service. The second field 406 is a broadcast service type field. In an embodiment, the broadcast service type field 406 includes two subfields, an encoding profile field 408 and a service profile field 410. The encoding profile field 408 includes information about characteristics of the encoded data of the service. For example, the encoding profile can include information about the associated broadcast service, such as, the type of encoding used (MPEG, WMAV, etc.), the encoding rate, the frame rate, and the resolution used in encoding the content data for the broadcast service. In one embodiment, the resolution can be used by a client station to identify a type of client device that can access the service. For example, some client devices, such as a cellular phone, or a PDA may not be able to access services at a particular resolution while another client device, such as a laptop computer, may be able to access services at that particular resolution.

The service profile field 410 includes information identifying the channels of the broadcast service available in the macro-diversity region, such as, for example, television broadcast stations, such as ABC, or NBC, included in the macro-diversity region. For example, the service profile field 410 may include an individual identifier (e.g., an encoded textual entry) identifying each available content channel. In still another embodiment, the service profile field 410 includes information identifying an individual piece of content in the macro-diversity region, such as for example, the evening news on ABC. In other embodiments combinations of information identifying the service can be used.

In yet another embodiment, the broadcast service type field 406 may be used to store a profile number that corresponds to a particular broadcast service type. For example, a particular profile number may be used to both identify the type of channel encoding used for the broadcast service (e.g., MPEG at a particular resolution) and the channels included in the broadcast service (e.g., CNN, Fox News, ESPN, etc.). That is, for example, one profile number may be used to identify a group of channels encoded using MPEG with a low resolution for display on cell phones, a different profile number may be used to identify the same group of channels but encoded with a higher resolution for display on a television, yet a different number may be used to identify a different group of channels encoded with a particular resolution, and so on. Or, for example, in an embodiment using an encoding profile field and a service profile field, one or both of these fields may use a profile number to identify a particular subset of properties (e.g., the type of encoding, and the available content channels, respectively) for the broadcast service.

A client station can decode a received SII-ADV message and determine, based on information in the message, if there is content data of interest in the macro-diversity region. If there is content data of interest, then the client station can decode the macro-diversity region and use the included macro-diversity map to retrieve the desired content data from the macro-diversity region. If it is determined that there are no broadcast services of interest, or no broadcast services that the client station can decode, then the client station can ignore, and not decode the macro-diversity region. In this way the client station can conserve resources.

In an embodiment, the client station determine whether there is content data of interest in the macro-diversity region by examining the broadcast CID included in the broadcast service tag of the received SII-ADV message. If this broadcast CID matches a broadcast CID stored by the client station (e.g., the client station subscribes to the broadcast service identified by the stored broadcast CID) then the client station can decode the macro-diversity region and retrieve the content data of interest to the client station.

In another embodiment, even if the broadcast CID doesn't correspond to a broadcast service to which the client station subscribes, the client station may examine the broadcast service type field 406 to determine whether the macro-diversity region includes content data of interest to the client station that is encoded using an encoding scheme and resolution supported by the client station. For example, if the client station desires to receive CNN but the client station does not receive a signal including a message including a broadcast CID for a broadcast service to which the client station subscribes, the client station may examine the broadcast service type field 406 to see if CNN is included in the macro-diversity region as well as to see if the client station supports the encoding scheme used for encoding the CNN channel. If the desired content is present and encoded using a supported encoding scheme, the client station may then decode and retrieve the content data of interest to the client station from the macro-diversity region. Further, in such an embodiment, prior to retrieving the content data from the macro-diversity region, the client station may display a question asking whether the user wishes to retrieve the content data from the broadcast service along with a cost to the user, if any, if the user elects to retrieve the content data. In such an example, if the user elects to receive the content data, a MAC management message may be sent from the client station including information regarding the client station that can be forwarded to the ASP for billing purposes. It should be noted that these are but examples of how a client station may use the information in the broadcast service tag 402 to determine whether or not to decode and retrieve content data from the macro-diversity region.

Figure 5:
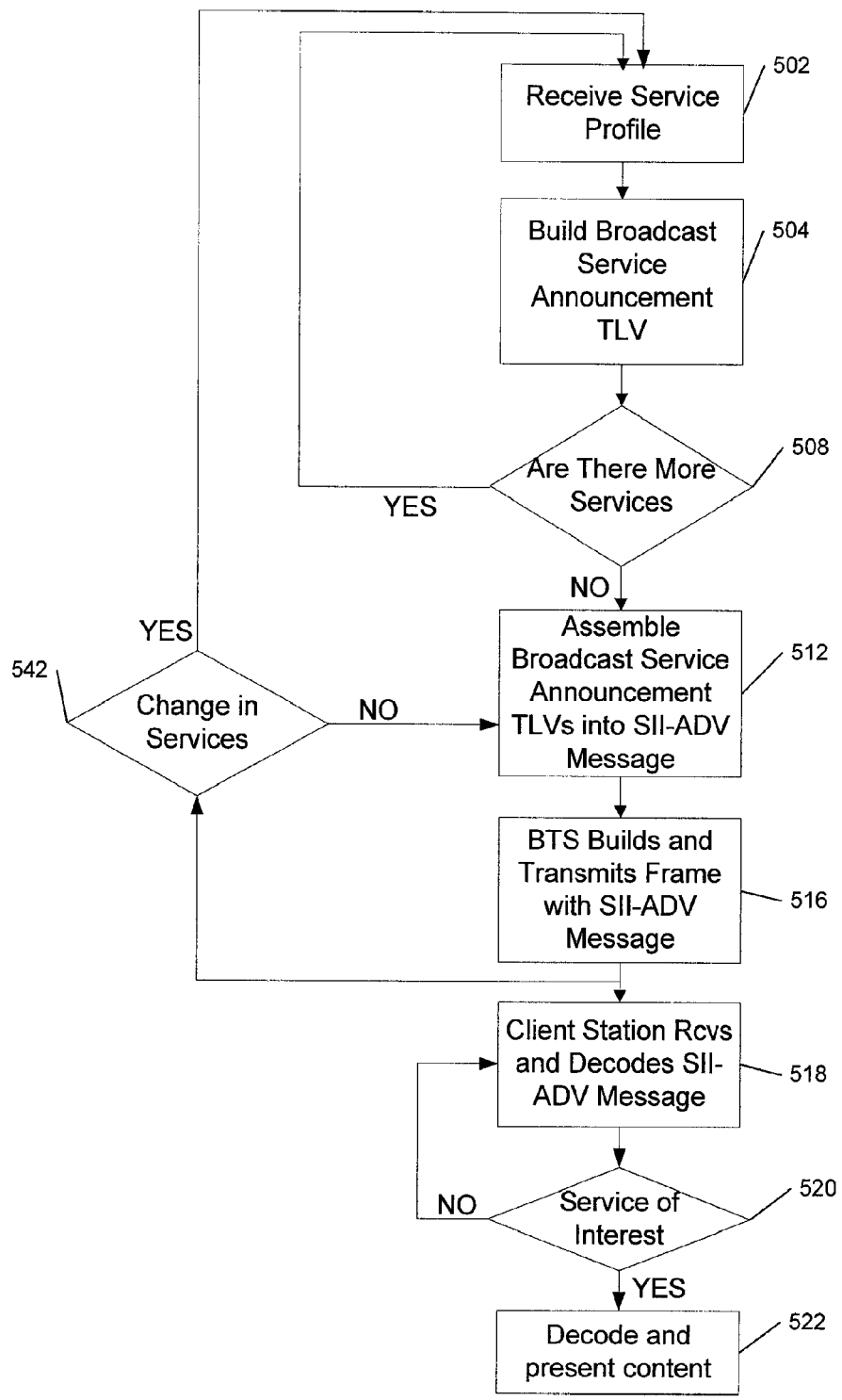
FIG. 5 is a flow chart of an exemplary method for building broadcast service announcement TLVs to be included in an SII-ADV message in accordance with an embodiment.

FIG. 5 is a flow chart of an example embodiment of building a management message for identifying content data available in a macro-diversity region of a data frame. For exemplary purposes, FIG. 5 will be described with reference to a management message that is an SII-ADV message including a broadcast service tag, such as illustrated in FIG. 4. FIG. 5 will further be described with reference to the above-discussed FIG. 1. Flow begins in block 502 where a BTS 130 receives, a service profile of a broadcast service that is to be provided in a macro-diversity region of a data frame transmitted by the BTS 130. For example, the service profile for the broadcast service can include the broadcast CID for the broadcast service, the encoding type and resolution used for encoding the content data, the type of service, such as broadcast television service, or pay-per-view service, and information identifying particular services such as a particular television broadcast station provided in the broadcast service. In still another embodiment, the service profile can include information identifying an individual piece or pieces of content in the macro-diversity region such as a particular television show that is being broadcast.

Further, as noted above, in an embodiment, the broadcast service type may be identified by a service profile number that a client station may look up in a table to identify the channels of content data as well as information regarding the encoding scheme and resolution used in encoding the content data. As such, in such an example, the service profile received by the BTS 130 may include the broadcast CID as well as the service profile number for the broadcast service. This service profile may be, for example, provided by the ASP 160 which may, for example, use a management messaging scheme for communicating a management message including the service profile to, for example, the ASN Gateway 120, which then distributes the service profile to the BTSs 130. In an embodiment, this management message may be provided by the ASP 160 to an element manager (not shown) included in the ASN 105, which then provides the management message to the ASN Gateway 120, or, for example, directly to the BTSs 130. Or, in, for example, embodiments in which only one broadcast service is included in the macro-diversity region defined by the macro-diversity region control module 150, the service profile may be stored by the ASN Gateway 120 or BTSs 130, such as, for example, during set-up and provisioning of the ASN Gateway 120 or BTSs 130, respectively.

Flow then continues to block 504 where a MAC control layer module executing in the BTSs 130 builds a broadcast service tag, such as described above with reference to FIG. 4. In block 510, the MAC control layer module then determines if there are more broadcast services included in the macro-diversity region provided to the BTS 130 by the macro-diversity region control module 150. If there are additional broadcast services, flow continues to block 502 and the service profile is retrieved or obtained, such as described above, for the next broadcast service include in the macro-diversity region. Then, a new broadcast service tag 402 is determined for this broadcast service. In block 510 if it is determined there are no additional services to announce as included in the macro-diversity region, flow continues to block 512. In block 512, the BTS 130 assembles the broadcast service announcement TLV's into an SII-ADV message, such as discussed above with reference to Table 1. As discussed above, in an embodiment, the macro-diversity region control module 150 defines the macro-diversity region comprising the content data and provides the defined macro-diversity region to the BTSs 130 for inclusion in the data frames built by the BTSs 130. This building of the macro-diversity region and providing of same to the BTSs 130 may be performed concurrent with the BTSs 130 building the SII-ADV message.

The BTSs 130 then in block 516 may each assemble a data frame, such as data frame 202 of FIG. 2, that the BTSs 130 transmit to the client stations 132. As discussed above, in an embodiment, the SII-ADV message is a MAC management message, and as such, in an embodiment, is transmitted by the BTSs 130 in the downlink data region 236 of the data frame 202 while the content data is included in the macro-diversity region 240 of the data frame 202. Further, as noted above, the BTSs 130 may use different modulation and encoding schemes for transmitting the different regions of the frame 202. For example, in an embodiment the BTSs 130 may transmit the downlink region 236 using QPSK while the BTSs 130 transmit the macro-diversity region 240 using 64 QAM. Further, in an embodiment, the BTSs 130 each synchronously transmit the macro-diversity region using the same modulation and coding scheme. The BTSs 130, however, may each use different modulation and coding schemes for transmitting the individual downlink regions 236 included in the frames transmitted by each BTS 130.

As noted above, in an embodiment, the BTSs 130 may periodically broadcast the SII-ADV message. For example, the BTSs 130 may periodically broadcast the SII-ADV message to the client stations 132, such as, for example, in every frame, every other frame, every fourth frame, and so on, transmitted by the BTSs 130. Further, if after building and transmitting the SII-ADV message, the BTSs 130 receives a new or modified service profile in block 542, the process may return to block 502 and build a new or modify an existing broadcast service announcement TLV.

The data frame broadcasted by the BTSs 130 is then at block 518 received by a client station 132, which decodes the downlink data region 236 and retrieves the SII-ADV message. The client station 132 then determines in block 520 whether the SII-ADV message indicates that macro-diversity region 240 of the frame 202 includes content of interest to the client station 132. The client station 132 may determine this by retrieving the broadcast service tags 402 from the SII-ADV message and examining them to see if there is a broadcast service tag 402 including a broadcast CID identifying a broadcasting service including the content of interest to client station 132. Further, the client station 132 may also examine the broadcast service type field 406 in determining if the content of interest is available in the macro-diversity region 240 and is encoded in a manner supported by the client station 132.

For example, if a client station 132 subscribes to a broadcast service identified by a particular broadcast CID, and the user of the client station 132 wishes to view a particular channel (e.g., CNN), the client station 132 may first examine the broadcast CIDs in the SII-ADV message to see if it includes the broadcast CID for the broadcast service to which the client station subscribes. If so, the client station may then examine the broadcast service type field 406 to determine whether the broadcasted content includes the desired channel and that the desired channel is encoded in a manner supported by the client station. For example, if the client station is a cell phone, it may only be able to decode and display content data encoded using MPEG with a low resolution.

Or, for example, in another embodiment, a broadcast CID may be used by the system that both identifies the broadcast service as well as the particular broadcast content and the encoding used. Or, in yet another example, the client station 132 may first look for a broadcast CID in the SII-ADV message corresponding to a broadcast service to which the client station subscribes. If, however, the client station 132 does not locate such a broadcast CID in any received SII-ADV message, the client station 132 may next look at the broadcast service type field 406 to determine if a macro-diversity region includes the content of interest to the client station 132 and whether this content data is encoded in a manner supported by the client station 132. If so, the client station 132 may retrieve, decode, and present the desired content data to the user. Further, in such an example, the client station 132 may first inquire from the user whether the client station 132 should retrieve and decode the content data as well as the cost to the user, if any, before decoding the content data. And, if the user elects to receive the content data, the client station 132 may transmit a message indicating such to the BTSs 130, such that billing information for the client station 132 may be forwarded to the ASP 160 for appropriately billing the user.

If the client station 132 determines that the macro-diversity region 240 includes content of interest to the user, the client station may then decode the macro-diversity region 240 and present the content data to the user at block 522. As noted above, the macro-diversity region 240 may use a different modulation and coding scheme than the downlink region 236. If the client station 132, however, determines that the macro-diversity region 240 does not include content of interest to the client station 132, the client station 132 returns to block 518 and continues to examine received SII-ADV messages looking for a BTS 130 transmitting a macro-diversity region 240 comprising the content desired by the client station.

Although FIG. 5 was discussed with reference to the BTS 130 building the broadcast service tags and SII-ADV messages, in other embodiments these entities may be built by different elements. For example, in an embodiment, the macro-diversity region controller 150 or ASP 160 may be responsible for building these entities and providing them to BTSs 130 for transmission by the BTSs 130 in the downlink region of the data frame.

Figure 6:
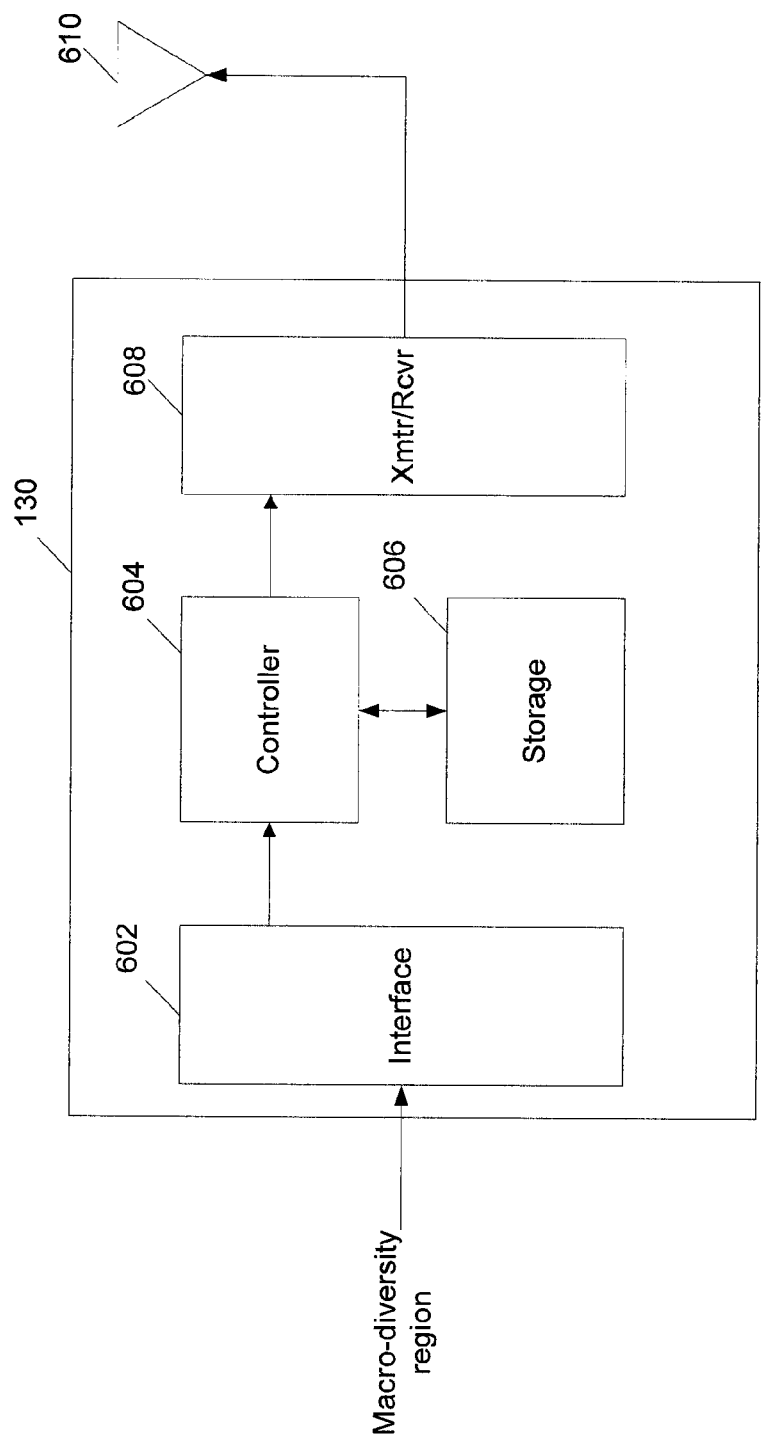
FIG. 6 is a simplified block diagram illustrating an exemplary macro-diversity region control module in accordance with an embodiment.

FIG. 6 is a block diagram illustrating a simplified exemplary embodiment of a BTS. For explanatory purposes, FIG. 6 will be discussed with reference to the above-discussed FIG. 1. As illustrated, BTS 130 may comprise a first interface 602, controller 604, a storage device 606, a transceiver 608, and an antenna 610. Interface 602 may comprise hardware and/or software for receiving content data, such as for example, a macro-diversity region defined by the macro-diversity region control module 150 and a service profile provide by ASP 160. Transceiver 608 may comprise hardware and/or software for transmitting and/or receiving data, such as, for example, MAC management messages, content data, etc. For example, as discussed above, in an embodiment utilizing an OFDMA frame in accordance with IEEE 802.16e, the transceiver 608 may be used to transmit the downlink region and macro-diversity region of the frame and receive the uplink region. Antenna 610 may for example be any type of antenna, such as those commercially available.

Controller 604 may, for example, comprise one or more processors configured for generating MAC management messages, such as, for example, the above described SII-ADV message comprising a broadcast service field tag 402, such as discussed above with reference to FIG. 4. Controller 604 may further be configured for building a data frame comprising a downlink region and macro-diversity region, such as macro-diversity region 240 and map 242 that were discussed above with reference to FIG. 2. The generated MAC management messages, including the above-described SII-ADV message, may be placed by the controller 604 in the downlink region for transmission to the client stations 130. Controller 604 may further be configured for managing the synchronous transmission of the macro-diversity region by the BTS 130 such that the macro-diversity regions transmitted by the BTSs 130 in the network 100 are synchronously transmitted by the BTSs 130 using a common modulation and coding scheme, as discussed above. Further, as noted above, the downlink regions transmitted by the various BTSs 130 in the network 100 may be transmitted using different modulation and coding schemes.

Storage 606 may comprise volatile and/or non-volatile storage. For example, in an embodiment, storage 606 may comprise one or more non-volatile storage devices, such as for example, read only memory (ROM), non-volatile random access memory (NVRAM), etc. along with one or more volatile storage devices, such as, for example, random access memory (RAM). Storage 606 may be used to store, for example, information for use by the controller 604 in building the data frames. For example, in an embodiment, in which the macro-diversity region control module 150 is only used for transmitting content data belonging to one broadcast service, storage 606 may store the broadcast CID for this broadcast service as well as, for example, information identifying the type of encoding used to encode the content data as well as information identifying the particular content channels belonging to the broadcast service. As noted above, in an embodiment, the information identifying the encoding used may be a profile number that a client station can look up in a table to determine the encoding protocol used as well other information regarding how the content data was encoded (e.g., the resolution of the content data). Similarly, the information stored by the storage device may comprise a content profile number that a client station may look up in a table stored by the client station to determine, for example, the particular content channels carried in the macro-diversity region of the received data frame.

Further, in an example, in which the macro-diversity region is used to carry content data belonging to multiple broadcast services, controller 604 may further be used to receive and process management messages received from, for example, the ASP providing the broadcast service. For example, referring back to FIG. 1, ASP 160 may provide management messages including the broadcast CID for the content data it provides as well as information identifying the contents data's encoding and information identifying the particular content data (e.g., content channels) provided by ASP 160 to broadcast service network 115. Controller 604 may then store this information in storage 606 and use the received information in generating the management message identifying the content data included in the macro-diversity region.

Figure 7:
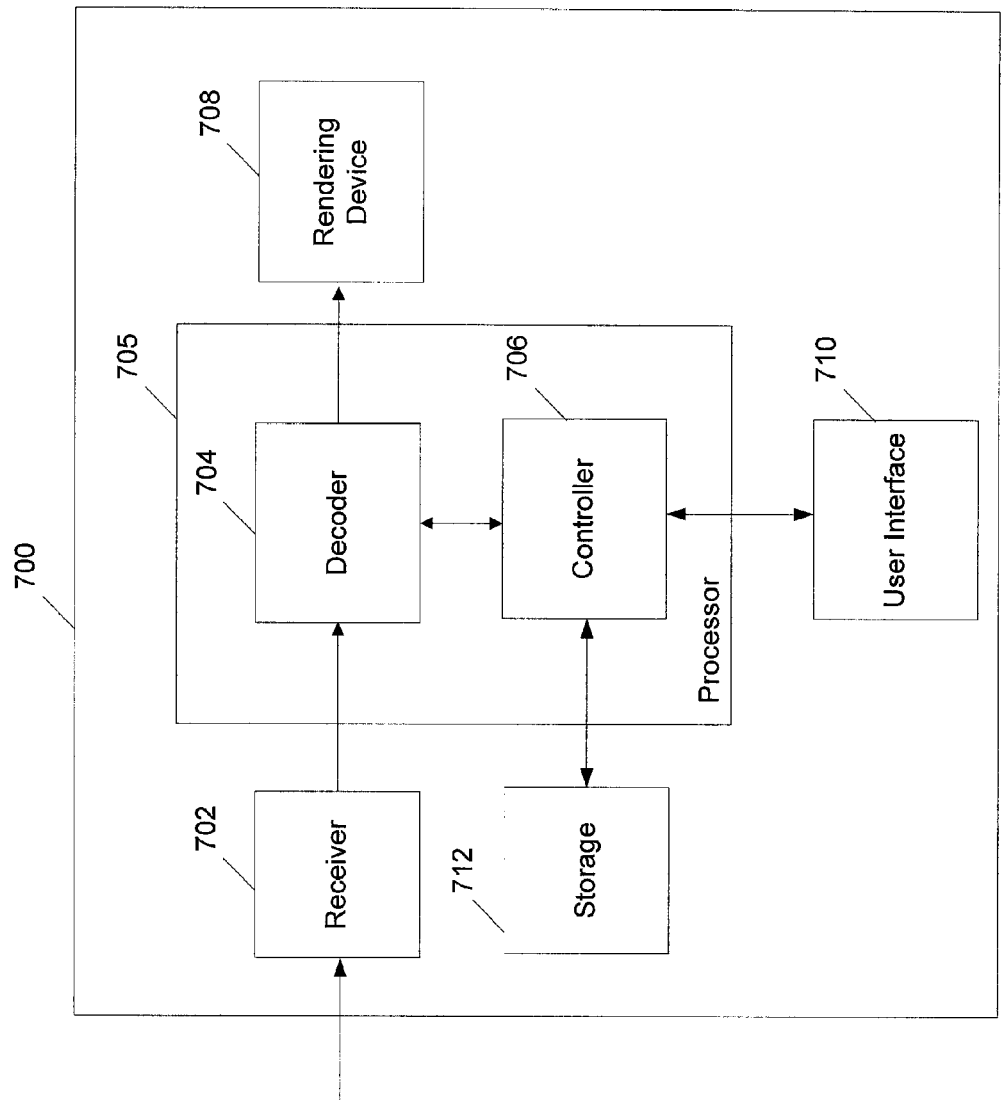
FIG. 7 is a simplified block diagram illustrating an example embodiment of portions of a client station in accordance with an embodiment.

FIG. 7 is a block diagram illustrating an example embodiment of portions of a client station. As shown in the example of FIG. 7, the client station 700 includes a receiver 702, a processor 705, a user interface 710, and an output device 708. Rendering device 708 may be, for example, any device capable of presenting content data to a user, such as for example, a Liquid Crystal Display (LCD), High Definition Television (HDTV), a speaker, etc. User interface 710 may comprise any device capable of permitting client station 700 to receive information from a user, such as, for example, a key pad, a key board, a mouse, a touch screen, a microphone, etc.

Storage 712 may comprise any combination of volatile or non-volatile storage (e.g., RAM, ROM, etc.). Storage 712 may be used to store information regarding the content of interest to the client device 700, such as, for example, a broadcast CID of broadcast services to which the client station subscribes, the particular content data (e.g., CNN, EPSN, etc.) the user desires to receive, and the rendering capabilities of the client device 700 (e.g., what type of encoding the client device 700 can decode as well as the resolution or other parameters of the rendering device 708).

In an embodiment, a user may be able to enter information regarding the content of interest to the user using the user interface 710 that is then stored by controller 706 in storage 712. For example, in an embodiment in which rendering device 708 is a display, rendering device 708 may present information regarding available broadcast services and its associated content data to the user on the display. The user may then select the particular content of interest to the user using the user interface 710 that controller 706 then stores in storage 712. For example, the user may enter via user interface 710 information indicating that the user wishes to receive a particular sports channel. The controller 710 may then store this information in storage 712. Or, for example, in an embodiment in which client station 700 includes a transmitter to permit two-way communications, a user using user interface 710 may communicate with an ASP via a network, such as a WiMax network, to subscribe to a broadcast service provided by the ASP. The ASP may then transmit the broadcast CID for the broadcast service, along with any de-encryption information if, for example, the broadcasted content data is encrypted by the ASP to the client station 700. The controller 706 may then store this received information in storage 712.

The receiver 702 may include, for example, an antenna as well as hardware and/or software for receiving data transmitted from a BTS and communicating the received data to a processor 705. The processor 705 may comprise, for example, a decoder module 704 responsible for decoding signal received from a BTS and forwarding the decoded signals (e.g., the content data) to a rendering device 708. The processor may further comprise a controller responsible for management of the client station 700 such as for example providing MAC management, etc.

In operation, when client station 700 receives a data frame from a BTS, decoder module 704 identifies and locates the start of the data frame. Decoder module 704 then decodes at least a portion of the received data. For example, referring back to the exemplary data frame of FIG. 2, the decoder module 704 can decode the preamble 208, FCH 210, DL-Map 212, UL-Map 214, and the downlink data region 236.

The controller 706 may then analyze the decoded data and identify any MAC management messages in the downlink data region 236 for the client station 700. As noted above, and referring back to Table 1 and FIG. 4, in an embodiment, an SII-ADV message, which has a management message type field with a value of 68, may be used by the system to send information identifying the content data in the macro-diversity region 240 of the data frame 202. The controller 706 when analyzing the received MAC management messages may determine that a received message is an SII-ADV message for the client station 700 by analyzing this management message type field.

The controller 706 may then retrieve the broadcast service tags 402 from the SII-ADV message and examine the information contained therein to determine if there is content data of interest to the client station 700 in the macro-diversity region 240. For example, the controller 706 may retrieve the stored information regarding the content of interest from the storage 712 and compare the information with the information received in the broadcast service tags 402. As noted above, in an embodiment, storage 712 may store the broadcast CID for the content of interest to the client station. In such an example, the controller 706 may simply analyze the broadcast CIDs received in the broadcast service tags 402 to determine if there is a match with the stored broadcast CID. Or, for example, the client station may retrieve the information from the storage 712 regarding the rendering capabilities of the client station 700 as well as the particular content data or interest to the user (e.g., a sports program). The controller 706 may then compare this retrieved information with the information in the received broadcast service tags 402 to determine if there is a match (i.e., the macro-diversity region contains both the content channel of interest and that it is encoded in a manner supported by the client station). If so, the controller 706 may determine that the macro-diversity region contains content of interest to the client station. Further, as was discussed above with reference to block 520 of FIG. 5, the user of the client station 700 may be asked whether they wish to receive the content data as well as its cost if it is determined that the macro-diversity region contains the content of interest to the user but the user doesn't subscribe to the particular broadcast service being received.

If the controller 706 determines that there is content data of interest, then the processor 706 can direct the decoder module 704 to decode the macro-diversity region of the received data and provide the decoded content data for the desired content to the rendering device 708 for presentation to a user. If there is, however, no content data of interest, or the characteristics of the services indicate that the service can not be decoded by the client station, the processor 706 can direct the decoder module 704 to not decode the macro-diversity region of the received data, thereby conserve resources, such as power, in the client station.

Although processor 705 was illustrated as a single device comprising separate software modules, it should be noted that in other embodiments, processor 705 may comprise a plurality of hardware devices (e.g., ASICs, DSPs, etc.) and/or software modules configured to operate in a manner such as described above. For example, in an embodiment, the decoder 704 and controller 706 of processor 705 may be performed by separate pieces of hardware or the may be combined on a single piece of hardware.

Various implementations of the present disclosure are realized in electronic hardware, computer software, or combinations of these technologies. Some implementations include one or more computer programs executed by one or more computing devices. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., interfaces, mice, and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention disclosure have been described. However, one of ordinary skill in the art will see that additional implementations are also possible and within the scope of the present disclosure.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use what is disclosed. Various modifications to these implementations will be readily apparent to those skilled in the art, and the generic principles described herein can be applied to other implementations without departing from the spirit or scope of the disclosure. Thus, it is to be understood that the description and drawings presented herein represent example implementations of the disclosure and are therefore representative of the subject matter which is broadly contemplated by the present disclosure. It is further understood that the scope of the present disclosure fully encompasses other implementations and that the scope of the present disclosure is accordingly limited by nothing other than the appended claims.

The invention claimed is:

1. A method of broadcasting content data to a plurality of client stations, the method comprising:
   receiving information regarding a macro-diversity region in which at least one packet comprising content data is allocated;
   generating a management message identifying the content data included into the macro-diversity region; and
   transmitting a data frame comprising the macro-diversity region and a data region, the data frame being an orthogonal frequency division multiple access (OFDMA) data frame, the management message identifying the content data included into the macro-diversity region being included in the data region of the data frame, the management message including a broadcast channel identifier (CID) that identifies a broadcast service to which the content data belongs.

2. The method of claim 1, wherein the management message comprises a broadcast service field.

3. The method of claim 2, wherein generating a management message further comprises generating a management message in which information regarding an encoding used in encoding the content data is included in the broadcast service field.

4. The method of claim 2, wherein at least one packet comprising content data for each of a plurality of different content channels is included into the macro-diversity region, and wherein generating a management message further comprises generating a management message in which information for identifying each of the different content channels is included in the broadcast service field.

5. The method of claim 1, further comprising:
   transmitting the data region and the macro-diversity region of the data frame using different modulation and coding schemes.

6. The method of claim 1, further comprising:
   generating a map message for transmission in the macro-diversity region of the data frame wherein the map message comprises the broadcast channel identifier identifying the content data.

7. The method of claim 1, wherein the plurality of client stations are included in a single frequency network, and wherein transmitting the management message in a data region of the data frame comprises:
   transmitting, by a base station in the single frequency network, a data frame comprising the macro-diversity region and the data region including the management message, wherein the transmission of the macro-diversity region by the base station is synchronized with a transmission of a macro-diversity region by at least one other base station in the single frequency network.

8. A method for identifying content data in a macro-diversity region of data frame, the data frame comprising at least a data region and a macro-diversity region, the method comprising:
   receiving the data frame, the data frame being an orthogonal frequency division multiple access (OFDMA) data frame;
   decoding a management message in the data region, the management message including information identifying content data available in the macro-diversity region of the data frame, the management message including a broadcast channel identifier (CID) that identifies a broadcast service to which the content data belongs;
   determining whether to decode at least a portion of the macro-diversity region of the data frame based on the information identifying the content data in the management message that identifies content data available in the macro-diversity region of the data frame;
   decoding at least a portion of the macro-diversity region to obtain content data if it is determined to decode the at least a portion of the macro-diversity region; and
   providing the decoded content data for presentation to a user.

9. The method of claim 8, wherein the management message comprises a broadcast service field.

10. The method of claim 9, wherein information identifying the content data in the management message comprises information regarding an encoding used in encoding the content data stored in the broadcast service field.

11. The method of claim 9, wherein the content data in the macro-diversity region comprises content data for each of a plurality of different content channels; and
   wherein the information identifying the content data in the management message comprises information stored in the broadcast service field for identifying each of the different content channels.

12. The method of claim 8, wherein the data region and the macro-diversity region of the received data frame are encoded using different modulation and coding schemes.

13. The method of claim 8, wherein the macro-diversity region of the received data frame comprises a map that includes a field storing a broadcast channel identifier identifying the content data.

14. A broadcast system for use in broadcasting content data to a plurality of client stations using a data frame, the data frame comprising at least a data region and a macro-diversity region, the system comprising:
   a first interface configured to receive information regarding a macro-diversity region comprising at least one packet comprising content data;
   a controller configured to generate a management message that includes information identifying the content data included into the macro-diversity region, the management message for transmission in the data region of the data frame, the management message including a broadcast channel identifier (CID) that identifies a broadcast service to which the content data belongs; and a transmitter configured to transmit the management message and the content data, the management message that includes information identifying the content data included into the macro-diversity region is transmitted in the data region of the data frame and the content data is transmitted in the macro-diversity region of the data frame, the data frame being an orthogonal frequency division multiple access (OFDMA) data frame.

15. The broadcast system of claim 14, wherein the management message comprises a broadcast service field.

16. The broadcast system of claim 15, wherein the controller is further configured to include information regarding an encoding used in encoding the content data in the broadcast service field.

17. The broadcast system of claim 14, wherein the controller is further configured to include in the broadcast service field information identifying each of a plurality of different content channels included into the macro-diversity region.

18. The broadcast system of claim 14, wherein the macro-diversity region of the data frame further comprises a map message comprising the broadcast channel identifier identifying the content data.

19. A client station that receives services broadcast in a data frame, the data frame comprising at least a data region and a macro-diversity region, the client station comprising:

a receiver configured to receive the data frame, the data frame being an orthogonal frequency division multiple access (OFDMA) data frame;

a decoder configured to decode a management message in the data region of the data frame, the management message identifying content data included in the macro-diversity region of the data frame, the management message including a broadcast channel identifier (CID) that identifies a broadcast service to which the content data belongs; and a processor configured to determine whether to decode at least a portion of the macro-diversity region based on the information identifying the content data management message that identifies content data included in the macro-diversity region of the data frame and to provide an instruction to the decoder regarding whether to decode the macro-diversity region based on the determination;

the decoder being further configured to decode the at least a portion of the macro-diversity region based on receipt of the instruction from the processor.

20. The client station of claim 19, wherein the management message comprises a broadcast service field.

21. The client station of claim 20, wherein the decoder is further configured to obtain, from the broadcast service field, information regarding an encoding used in encoding the content data.

22. The client station of claim 20, wherein the decoder is further configured to obtain, from the broadcast service field, information identifying each of a plurality of different content channels transmitted in the macro-diversity region.

* * * * *